United States Patent
Hattori et al.

(10) Patent No.: US 9,257,210 B2
(45) Date of Patent: Feb. 9, 2016

(54) LANTHANUM BORIDE SINTERED BODY AND METHOD FOR PRODUCING THE SAME

(71) Applicant: NGK INSULATORS, LTD., Nagoya (JP)

(72) Inventors: Tetsuya Hattori, Konan (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 242 days.

(21) Appl. No.: 14/014,857

(22) Filed: Aug. 30, 2013

(65) Prior Publication Data

US 2014/0061553 A1    Mar. 6, 2014

(30) Foreign Application Priority Data

Sep. 3, 2012  (JP) ................................. 2012-193497
May 27, 2013  (JP) ................................. 2013-110605

(51) Int. Cl.
*H01B 1/06* (2006.01)
*C04B 35/50* (2006.01)
(Continued)

(52) U.S. Cl.
CPC *H01B 1/06* (2013.01); *C04B 35/50* (2013.01); *C04B 35/5805* (2013.01); *C04B 35/64* (2013.01); *C04B 35/645* (2013.01); *C04B 2235/3227* (2013.01); *C04B 2235/3826* (2013.01); *C04B 2235/3891* (2013.01);
(Continued)

(58) Field of Classification Search
CPC ............... H01B 1/00; H01B 1/04; H01B 1/06; C23C 14/067; C04B 2235/77; C04B 2235/3804; C04B 35/58; C01B 25/03
See application file for complete search history.

(56) References Cited

U.S. PATENT DOCUMENTS 4,261,753 A    4/1981    Holcombe et al.
4,309,467 A    1/1982    Kovach et al.
(Continued)

FOREIGN PATENT DOCUMENTS

EP    0 409 717 A1    1/1991
EP    0 454 532 A1    10/1991
(Continued)

OTHER PUBLICATIONS

Zhou et al "Fabrication and characterization of high-purity nanostructured bulk LaB6 polycrystal cathode material", Journal of Inorganic Materials, vol. 23, No. 6, (Nov. 2008) pp. 1199-1204.*

(Continued)

*Primary Examiner* — Mark Kopec
(74) *Attorney, Agent, or Firm* — Burr & Brown, PLLC (57) ABSTRACT

A lanthanum boride sintered body includes a phase including lanthanum and silicon at grain boundaries between crystal grains of lanthanum boride. In this lanthanum boride sintered body, the phase exists in various configurations such as a phase present at a triple point of grain boundary, and a phase present along the grain boundary. This phase is based on a lanthanum silicide (represented by the composition formula $LaSi_x$ ($0<x\leq 2$)). The lanthanum boride sintered body is fabricated through a sintering step of sintering a lanthanum boride green compact by press-free sintering in an inert atmosphere or under vacuum in the presence of a silicon-containing material around and/or within the green compact. The lanthanum boride sintered body having this structure exhibits a relative density of not less than 92%, and more preferably not less than 94%.

16 Claims, 5 Drawing Sheets

(51) Int. Cl.
   *C04B 35/64* (2006.01)
   *C04B 35/58* (2006.01)
   *C04B 35/645* (2006.01)

(52) U.S. Cl.
   CPC ... *C04B2235/5436* (2013.01); *C04B 2235/604* (2013.01); *C04B 2235/6021* (2013.01); *C04B 2235/6562* (2013.01); *C04B 2235/6565* (2013.01); *C04B 2235/6587* (2013.01); *C04B 2235/661* (2013.01); *C04B 2235/668* (2013.01); *C04B 2235/77* (2013.01); *C04B 2235/80* (2013.01); *C04B 2235/85* (2013.01); *C04B 2235/87* (2013.01)

(56) References Cited

U.S. PATENT DOCUMENTS

| | | | |
|---|---|---|---|
| 4,661,740 A * | 4/1987 | Knoch et al. | 313/346 R |
| 5,470,506 A | 11/1995 | Tanigami et al. | |
| 2013/0017137 A1 * | 1/2013 | Takahashi | C04B 35/5805 423/289 |

FOREIGN PATENT DOCUMENTS

| | | |
|---|---|---|
| JP | 04-228474 | 8/1992 |
| JP | 2004-250725 | 9/2004 |
| JP | 2011-063487 | 3/2011 |
| JP | 2011-136876 A1 | 7/2011 |
| JP | 2011-195337 | 10/2011 |
| WO | 2010/001796 A1 | 1/2010 |
| WO | WO2011122100 A1 * | 6/2011 |

OTHER PUBLICATIONS

Extended European Search Report (Application No. 13182691.9) dated Nov. 27, 2013.

* cited by examiner

No Peak of LaSix

LANTHANUM BORIDE SINTERED BODY AND METHOD FOR PRODUCING THE SAME

BACKGROUND OF THE INVENTION

1. Field of the Invention

The present invention relates to lanthanum boride sintered bodies and methods for producing the same.

2. Description of the Related Art

As proposed in the art (see, for example, Patent Literature 1), conventional lanthanum boride sintered bodies are produced by mixing lanthanum boride powders having an average particle diameter of 1 to 5 μm, a carbon content of less than 0.1 mass % and an oxygen content of less than 1.0 mass % with lanthanum boride powders having an average particle diameter of 50 to 500 nm, and sintering the mixture by hot pressing at a temperature of not less than 1800° C. and a pressure of not less than 20 MPa. Such sintered bodies allegedly have a high purity and exhibit an increased density, and a relative density of 93% has been obtained. It is also proposed that lanthanum boride green compacts are pressed in a hot press furnace and are thereafter subjected to an HIP treatment to further reduce the porosity; a relative density of 93% has been obtained (see, for example, Patent Literature 2). It is further proposed that a metal powder such as Fe, Co or Ni is admixed with a lanthanum boride powder having an average particle diameter of 1 to 20 μm, and the mixture is compacted, subjected to a pressure of 1 to 100 MPa and sintered at a temperature of about 1500 to 2000° C. in a spark plasma sintering furnace; a relative density of 99.3% has been obtained (see, for example, Patent Literature 3). It is furthermore proposed that a green compact of lanthanum boride and metallic silicon is sintered at a pressure in the range from $1.33 \times 10^4$ Pa to atmospheric pressure; a relative density of 91% has been obtained (see, for example, Patent Literature 4). Sintered bodies obtained by such a method allegedly exhibit higher stability and improved thermionic emission characteristics.

[PTL 1] Japanese Unexamined Patent Application Publication No. 2011-063487
[PTL 2] Japanese Unexamined Patent Application Publication No. 2011-195337
[PTL 3] Japanese Unexamined Patent Application Publication No. 2004-250725
[PTL 4] Japanese Unexamined Patent Application Publication No. 04-228474

SUMMARY OF THE INVENTION

However, the relative density of lanthanum borides obtained by the production methods described in Patent Literatures 1 and 2 is as low as about 93% in spite of the fact that hot pressing is performed during sintering. Although a relative density of 99.3% has been obtained according to Patent Literature 3, this technique entails pressurization by spark plasma sintering as well as the addition of a metal powder such as Fe, Co or Ni. In general, sintering that involves hot pressing is limited to the production of plate-shaped sintered bodies. Thus, the producible shape is limited. While the technique of Patent Literature 4 is free from the need of hot pressing during sintering, the highest relative density obtained is as low as about 91%, indicating insufficient densification. That is, a problem remains in that sintered bodies with high density should be obtained without involving hot pressing.

The present invention has been made in view of the problems described above. It is therefore a main object of the present invention to provide novel lanthanum boride sintered bodies having an enhanced relative density, and methods for producing such sintered bodies.

The present inventors carried out extensive studies in order to achieve the above main object. As a result, the present inventors have found that the relative density can be enhanced without the need of pressing, for example, hot pressing, by the incorporation of a silicon-containing material around or within the green compacts of lanthanum boride. The present invention has been completed based on the finding.

A lanthanum boride sintered body according to the present invention comprises a first phase including lanthanum boride, and a second phase including lanthanum and silicon.

Alternatively, a lanthanum boride sintered bodies of the invention may include silicon and have a relative density of not less than 92%.

Still alternatively, a lanthanum boride sintered body of the invention may be a sintered body which is obtained by press-free sintering and has a relative density of not less than 92%.

A method for producing lanthanum boride sintered bodies according to the present invention comprises a sintering step of sintering a lanthanum boride green compact in an inert atmosphere (Ar, He or vacuum) in the presence of a silicon-containing material around or within the green compact.

The relative density can be enhanced according to the lanthanum boride sintered bodies and the production methods therefor of the present invention. The reason for this is not clear but is probably as follows. As a possible consideration, Si components are released from the silicon-containing material by volatilization or the like during sintering of lanthanum boride and form a liquid phase in sites such as at grain boundaries of the lanthanum boride so as to function as a sintering additive which enhances the densification of hard-sintering lanthanum boride. This may be probably the reason why the presence of a silicon-containing material allows for the production of lanthanum boride sintered bodies having an enhanced relative density through a simplified step. It has been found that the sinterability of lanthanum boride are also enhanced by the formation of the liquid phase also by introducing a silicon-containing material in the lanthanum boride green compacts instead of the sintering in the silicon-containing material.

DETAILED OF THE INVENTION

A lanthanum boride sintered body according to the present invention comprises a first phase including lanthanum boride, and a second phase including lanthanum and silicon. The second phase may be present at grain boundaries of lanthanum boride. The term "grain boundaries" refers to boundaries between or among crystal grains of lanthanum boride. The second phase may be present at a triple point of grain boundary or along grain boundaries of lanthanum boride. The main component of the lanthanum boride sintered bodies of the invention is represented by the composition formula $LaB_6$.

In the inventive lanthanum boride sintered bodies, the main component of the second phase may be lanthanum silicide. For example, the lanthanum silicide may be represented by the composition formula $LaSi_x$. The value x is not particularly limited, but is preferably $0<x\leq 2$. The value x is preferably closer to 2. From the viewpoint of the purity of the inventive lanthanum boride sintered bodies, it is desirable that lanthanum boride contain as little impurities as possible. The content of boron and lanthanum is preferably not less than 95 mass %, and more preferably not less than 98 mass %. From the viewpoint of sintering properties, the content of silicon is preferably not less than 0.02 mass %, and more preferably not less than 0.1 mass %. From the viewpoints of the purity and the sintering properties of lanthanum boride, it is preferable that the content of boron and lanthanum should be not less than 99 mass % and the content of silicon should be not less than 0.1 mass % and not more than 1.0 mass %. As for the application of the electrodes in arc tubes, for example, an excessive amount of silicon is not suitable due to the volatilization of lower melting point of $LaSi_x$ from the lanthanum boride sintered body. These might deteriorate the emission characteristics and life of arc tubes. The content of boron and lanthanum may be determined appropriately in accordance with, for example, the desired purity and relative density of lanthanum boride sintered bodies, as well as production conditions. Exemplary impurities include oxygen and carbon.

The lanthanum boride sintered bodies of the invention preferably have a relative density of not less than 92%, more preferably not less than 94%, and still more preferably not less than 95%. A higher relative density is more preferable because such sintered bodies are more suited for use as products such as electrodes and sputtering targets. A high relative density, in other words, a low porosity ensures that properties of the products are unlikely to be adversely affected because the amounts of water and gas components remaining in the pores are small. When the sintered bodies are used as electrodes in arc tubes as an example, suppressing the release of such impurities makes it possible to prevent emission characteristics from being adversely affected as well as to further suppress decreases in efficiency and durability. Further, because a higher relative density indicates that irregularities in the surface shape of electrodes due to pores have been suppressed, the electric field intensity can be suppressed from becoming nonuniform so as to suppress the occurrence of troubles such as abnormal discharge. When the sintered bodies are used as sputtering targets, similarly, the suppressed release of internal impurities enables the suppression of the film property decrease by making a more suitable sputtering atmosphere.

The lanthanum boride sintered bodies of the invention may be sintered without pressure-sintering such as hot pressing or HIP. In this manner, lanthanum boride sintered bodies having an enhanced relative density can be obtained through a simplified step. For example, such sintered bodies may be fabricated through a sintering step in which lanthanum boride green compacts are sintered in an inert atmosphere (Ar, He or vacuum) in the presence of a silicon-containing material around or within the green compacts. This sintering will be described in more detail in the context of production methods later.

Figure 1:
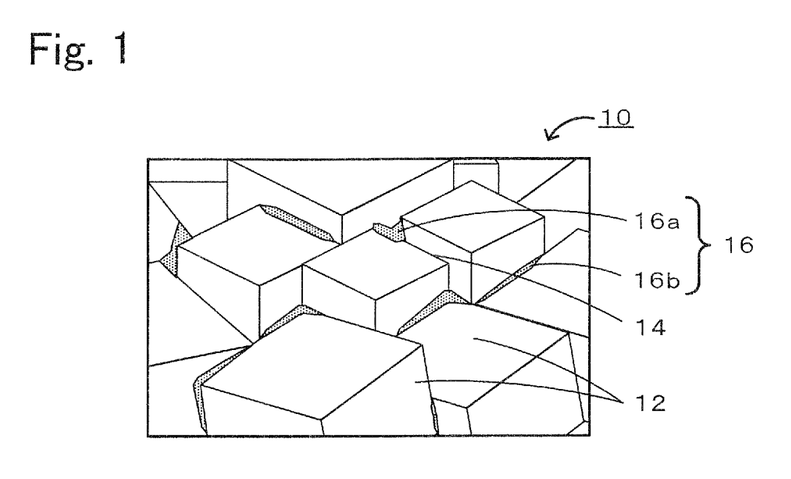
FIG. 1 is a view illustrating a microstructure of a lanthanum boride sintered body 10 in the present invention.

Next, the lanthanum boride sintered bodies according to the invention will be described with reference to the drawing. FIG. 1 is a view illustrating a microstructure of a lanthanum boride sintered body 10 in the present invention. The lanthanum boride sintered body 10 includes a second phase 16 including lanthanum and silicon at grain boundaries 14 between crystal grains 12 (a first phase) of lanthanum boride. In this lanthanum boride sintered body 10, the second phase 16 is present in various configurations such as a second phase 16a present at a triple point of grain boundary 14, and a second phase 16b present along the grain boundary 14. This second phase 16 is based on a lanthanum silicide (represented by the composition formula $LaSi_x$ ($0<x\leq 2$)). The lanthanum boride sintered body 10 having this structure exhibits a relative density of not less than 92%, and more preferably not less than 94%.

Next, methods for producing lanthanum boride sintered bodies according to the present invention will be described. For example, the production method may comprises a compacting step of compacting a lanthanum boride powder into a green compact, and a sintering step of sintering the green compact. In the compacting step, a lanthanum boride powder is compacted by a known method. For example, a lanthanum boride powder may be compacted with a uniaxial press machine, or may be uniaxially pressed and thereafter compacted by CIP. Alternatively, a mixture of a lanthanum boride powder and a binder may be kneaded and extruded to give a green compact. The binder added herein is preferably one having thermal decomposability. Alternatively, a casting method may be utilized. In view of densification, it is preferable that the green compacts have a higher density and have a relative density of not less than 55%. For example, it is preferable to use a lanthanum boride powder having an average particle diameter of not more than 10 μm, more preferably not more than 3 μm, and still more preferably not more than 2 μm. A lanthanum boride powder having an average particle diameter of not more than 3 μm is preferable because the densification of sintered bodies can be further facilitated. Here, the average particle diameter of the material powder is defined to indicate a median diameter (D50) measured with a laser diffraction/scattering particle size distribution analyzer. The shapes of the green compacts are not particularly limited, and the green compacts may be formed into any shapes giving the desired final shapes. The green compacts may be subjected to a heat treatment to remove binders and solvents.

In the sintering step, a lanthanum boride green compact is sintered by press-free sintering in an inert atmosphere or under vacuum in the presence of a silicon-containing material around or within the green compact. That is, this step performs at least one of sintering a lanthanum boride green compact in the presence of a silicon-containing material, and sintering a lanthanum boride green compact containing a silicon-containing material. This step results in a lanthanum boride sintered body which includes a first phase including lanthanum boride, and a second phase including lanthanum and silicon. The phrase "in an inert atmosphere" indicates that sintering is performed in an inert gas such as He or Ar. The term "press-free" is defined to indicate that there is no mechanical pressing or gas pressing during sintering, and may indicate that sintering is performed at atmospheric pressure. The inert atmosphere is preferably Ar. In the practice of press-free sintering, the atmosphere may be approximately equal to the atmospheric pressure or may be higher than the atmospheric pressure (for example, 1.5 atm or 2 atm) or lower than the atmospheric pressure (for example, 0.5 atm or 0.8 atm) as long as Si components volatilized from the silicon-containing material can migrate into the lanthanum boride green compacts. The silicon-containing materials that are present around or within the green compacts may be at least one of silicon carbide and silicon nitride. Of these, silicon carbide is preferable. The amount and the shape of the silicon-containing materials present around the green compacts may be selected appropriately in accordance with the size of the lanthanum boride green compacts as well as sintering conditions. The sintering step may be performed in such a manner that a lanthanum boride green compact is placed and sintered in a sintering container mainly composed of a silicon-containing material. Such a configuration is more preferable because the green compact is easily exposed to Si components volatilized from the silicon-containing material. For example, the sintering container may be formed of any of silicon carbide and silicon nitride. Examples of the sintering containers include sintering crucibles, capsules cases and so on. Alternatively, the sintering step may be performed in such a manner that a green compact is sintered while a silicon-containing material is disposed in the sintering container. In this case, the sintering container is preferably one which exhibits low reactivity with lanthanum boride. Except silicon-containing materials, boron nitride (BN) is preferable. Carbon-containing materials except silicon carbide, such as $B_4C$ and carbon (C), are not preferable because lanthanum boride is susceptible to carbonization. In the case where the lanthanum boride green compact contains a silicon-containing material, the sintering container may be composed of a silicon-containing material or boron nitride. When the lanthanum boride green compact contains a silicon-containing material, sintering may be carried out in the presence or absence of other silicon-containing materials (for example, green compacts of silicon-containing materials) around the green compact.

In the sintering step, the green compacts may be sintered at a maximum retention temperature (so-called sintering temperature) which exceeds 1650° C. and is less than 2000° C. This range of temperatures advantageously ensures that the green compacts can be further densified. For example, this range of temperatures may be adopted when the lanthanum boride green compacts are sintered in the presence of a silicon-containing material around the green compacts. When the lanthanum boride green compacts contain a silicon-containing material, the green compacts may be sintered at sintering temperature of 1650° C. or above. When the lanthanum boride green compacts contain a silicon-containing material, effects similar to those obtained when a silicon-containing material is present around the lanthanum boride green compacts can be attained even at a lower sintering temperature. For example, the maximum sintering temperature is preferably not less than 1675° C., and more preferably not less than 1700° C. Sintering at a temperature of not less than 1675° C. ensures that the relative density becomes stably not less than 92%. Significant growth of the grains of lanthanum boride is suppressed at temperatures of not more than 1750° C., and materials exhibiting high strength can be obtained. In view of this, the maximum sintering temperature is most preferably 1675 to 1750° C. For example, the retention time at the maximum sintering temperature may be in the range from 1 to 12 hours.

The sintering step may be performed in such a manner that in an inert atmosphere without pressing, the green compacts are initially held at a intermediate temperature lower than the maximum sintering temperature and are thereafter brought to the maximum sintering temperature. In this manner, the densification behavior can be stabilized. The intermediate temperature may be 1400° C., but is not limited thereto.

According to the lanthanum boride sintered bodies and the production methods therefor described hereinabove, the relative density can be enhanced. For example, the reason for this is probably because Si components are released from the silicon-containing material by volatilization or the like during sintering of lanthanum boride and form a liquid phase in sites such as at grain boundaries of the lanthanum boride so as to function as sintering additives which enhances the sinterability of hardly sintered lanthanum boride. Consequently, a phase including lanthanum and silicon is formed at sites such as grain boundaries in the lanthanum boride sintered bodies. Probably because of this mechanism, lanthanum boride sintered bodies having an enhanced relative density can be obtained through a simplified step in which a silicon-containing material is allowed to be present around the green compacts. Sintering is also facilitated by causing the lanthanum boride green compacts to contain a silicon-containing material instead of sintering the green compacts in the presence of a silicon-containing material. In this case, it is probable that Si components formed by the reaction during sintering are partly evaporated and partly form a liquid phase which enhances the sinterability of lanthanum boride.

It is needless to mention that the present invention is not limited to the aforementioned embodiments and may be carried out in various embodiments within the technical scope of the present invention.

For example, while the lanthanum boride sintered body in the above embodiment has been illustrated as including a first phase which includes lanthanum boride and a second phase which includes lanthanum and silicon, for example, the lanthanum boride sintered body may be one which includes silicon and has a relative density of not less than 92%. Novel lanthanum boride sintered bodies may be provided also according to such an embodiment. In such embodiments, any aspects of the aforementioned lanthanum boride sintered bodies and production methods therefor may be adopted.

Further, while the lanthanum boride sintered body in the above embodiment has been illustrated as including a first phase which includes lanthanum boride and a second phase which includes lanthanum and silicon, for example, the lanthanum boride sintered body may be one which is obtained by press-free sintering and has a relative density of not less than 92%. According to such an embodiment too, novel lanthanum boride sintered bodies may be provided by a simple method. In such embodiments, any aspects of the aforementioned lanthanum boride sintered bodies and production methods therefor may be adopted.

While the production method in the above embodiment has been illustrated as including a compacting step, the production method is not limited to such an embodiment. By separately preparing green compacts, the compacting step may be omitted.

EXAMPLES

Examples will be described below which specifically illustrate lanthanum boride sintered bodies and methods for the production thereof.

(Method for Producing Lanthanum Boride Sintered Bodies)

Commercially available $LaB_6$ powders (A, B and C) were weighed in at arbitrary masses. A thermally decomposable binder was added to each powder, and the mixture was extruded into a rod having a diameter of about 1.9 mm. The extrudate was cut to a length of about 20 mm (a compacting step). Next, the green compacts thus obtained were sintered (a sintering step). In the sintering step, the green compacts were placed in a SiC crucible (a sintering container) and sintered in an atmospheric sintering furnace composed of a carbon heater. Here, for example, the heating conditions were such that the temperature was raised to 1000° C. (initial temperatures) under vacuum (at a reduced pressure). During this heating, the temperature was raised to 400° C. at 200° C./h and further to 1000° C. at 1000° C./h. After the temperature reached 1000° C., the materials were held under vacuum for 1 hour. Subsequently, Ar gas was introduced until the pressure became 1.5 atm, and the temperature was raised to 1400° C. (intermediate temperature) at 200° C./h. The materials were held at 1400° C. for 2 hours. Thereafter, the temperature was raised to the maximum sintering temperature (for example, 1700° C.) at 200° C./h, and the materials were held at the maximum sintering temperature for 4 hours. After held at the maximum sintering temperature, the sintered bodies were cooled to 1200° C. at 200° C./h and were thereafter cooled by furnace cooling. During the above process, the pressure inside the furnace after the introduction of Ar gas was controlled to be 1.5 atm.

Examples 1 to 14

In Example 1, sintered bodies were fabricated in accordance with the above production method using the material powder A (average particle diameter: 2 µm, main impurities: 0.02 mass % C, 1.06 mass % O and 0.03 mass % Fe, other metal impurities: not more than the detection limit (0.01 mass %)) at a maximum sintering temperature of 1725° C. In Example 2, sintered bodies were fabricated under conditions similar to those in Example 1, except that the maximum sintering temperature was 1700° C. In Example 3, sintered bodies were fabricated under conditions similar to those in Example 1, except that the maximum sintering temperature was 1850° C. In Example 4, sintered bodies were fabricated under conditions similar to those in Example 1, except that the maximum sintering temperature was 1900° C. In Example 5, sintered bodies were fabricated under conditions similar to those in Example 1, except that the material powder B (average particle diameter: 3 µm, main impurities: 0.12 mass C, 0.90 mass % O and 0.04 mass % Fe, other metal impurities: not more than the detection limit (0.01 mass %)) was used. In Example 6, sintered bodies were fabricated under conditions similar to those in Example 1, except that the maximum sintering temperature was 1800° C. In Example 7, sintered bodies were fabricated under conditions similar to those in Example 1, except that the maximum sintering temperature was 1750° C. In Example 8, sintered bodies were fabricated under conditions similar to those in Example 1, except that the maximum sintering temperature was 1675° C. In Example 9, sintered bodies were fabricated under conditions similar to those in Example 1, except that the material powder B was used and the maximum sintering temperature was 1900° C. In Example 10, sintered bodies were fabricated under conditions similar to those in Example 1, except that the material powder B was used and the maximum sintering temperature was 1800° C. In Example 11, sintered bodies were fabricated under conditions similar to those in Example 1, except that SiC sintered bodies were disposed in the crucible. In Example 12, sintered bodies were fabricated under conditions similar to those in Example 1, except that the powder was shaped into pellets 20 mm in diameter and 3 mm in thickness and was treated by CIP at 3 tons. In Example 13, sintered bodies were fabricated under conditions similar to those in Example 1, except that the maximum sintering temperature was 1800° C. as well as that the powder was shaped into pellets 10 mm in diameter and 5 mm in thickness and was treated by CIP at 3 tons. In Example 14, sintered bodies were fabricated under conditions similar to those in Example 1, except that the maximum sintering temperature was 1900° C. as well as that the powder was shaped into pellets 10 mm in diameter and 5 mm in thickness and was treated by CIP at 3 tons.

Examples 15 to 17

In Example 15, sintered bodies were fabricated under conditions similar to those in Example 1, except that the sintering container was EN, the material powder A was mixed with 1.0 mass % in terms of Si of a SiC powder (average particle diameter: 4.2 µm, purity: at least 98%), the mixture was shaped into pellets 10 mm in diameter and 5 mm in thickness and was treated by CIP at 3 tons, and the maximum sintering temperature was 1650° C. In Example 16, sintered bodies were fabricated under conditions similar to those in Example 1, except that the sintering container was EN, the material powder A was mixed with 1.5 mass % in terms of Si of a SiC powder (average particle diameter: 4.2 µm, purity: at least 98%), the mixture was shaped into pellets 10 mm in diameter and 5 mm in thickness and was treated by CIP at 3 tons, and the maximum sintering temperature was 1675° C. In Example 17, sintered bodies were fabricated under conditions similar to those in Example 1, except that the sintering container was BN, the material powder A was mixed with 1.0 mass % in terms of Si of a SiC powder (average particle diameter: 4.2 µm, purity: at least 98%), and the mixture was shaped into pellets 10 mm in diameter and 5 mm in thickness and was treated by CIP at 3 tons.

Comparative Examples 1 to 7

In Comparative Example 1, sintered bodies were fabricated under conditions similar to those in Example 1, except that the maximum sintering temperature was 1650° C. In Comparative Example 2, sintered bodies were fabricated under conditions similar to those in Comparative Example 1, except that the mixture was shaped into green compacts approximately 10 mm in diameter and approximately 5 mm in thickness by uniaxial press forming using a mold, as well as that the sintering container was carbon (C) and the maximum sintering temperature was 1900° C. In Comparative Example 3, sintered bodies were fabricated under conditions similar to those in Comparative Example 2, except that the sintering container was $B_4C$. In Comparative Example 4, sintered bodies were fabricated under conditions similar to those in Comparative Example 2, except that the sintering container was BN. In Comparative Example 5, sintered bodies were fabricated under conditions similar to those in Comparative Example 4, except that the maximum sintering temperature was 1800° C. In Comparative Example 6, sintered bodies were fabricated under conditions similar to those in Comparative Example 5, except that the material powder B was used. In Comparative Example 7, sintered bodies were fabricated under conditions similar to those in Comparative Example 5, except that the material powder C (average particle diameter: 7 µm, main impurities: 0.06 mass % C, 1.28 mass % O and 0.04 mass % Fe, other metal impurities: not more than the detection limit (0.01 mass %)) was used.

Comparative Examples 8 and 9

In Comparative Example 8, sintered bodies were fabricated by hot pressing under conditions similar to those in Comparative Example 2, except that the sintering method was hot pressing (HP), and green compacts 35 mm in diameter and 5 mm in thickness were placed in a carbon (C) sintering container and sintered at a maximum sintering temperature of 1900° C. The pressure condition in the hot pressing was 200 kgf/cm². In Comparative Example 9, sintered bodies were fabricated under conditions similar to those in Comparative Example 8, except that the maximum sintering temperature was 2000° C.

Comparative Example 10

In Comparative Example 10, sintered bodies were fabricated under conditions similar to those in Comparative Example 4, except that green compacts of the material powder A mixed with 1.0 mass % of a metallic Si powder (average particle diameter: 2.5 μm, purity: at least 99%) with reference to Patent Literature 4 were sintered at a maximum sintering temperature of 1800° C. The green compacts were produced by the same method as in Comparative Example 2.

[Measurement of Relative Density]

The relative density of the lanthanum boride sintered bodies fabricated above was measured by the Archimedes method using ion exchange water as the medium. The relative density was calculated based on the true density of $LaB_6$ taken as 4.72 g/cm³.

[Identification of Crystal Phases]

Crystal phases were identified with an X-ray diffractometer. The measurement conditions were CuK-α, 40 kV, 40 mA and 2θ=5° to 70°. The step width in the measurement was 0.02°. A sealed tube X-ray diffractometer (D8 ADVANCE manufactured by Bruker AXS) was used.

[Microstructure Observation and Elemental Analysis]

The microstructure was observed with an electron microscope (SEM: XL-30 manufactured by PHILIPS). At the same time, the secondary phases were analyzed by using SEM-EDS.

[Analysis of Si Content]

The sintered body was subjected to alkali fusion and thereafter to acid dissolution, and was analyzed by ICP emission spectrometric analysis with an ICP-AES apparatus (ICAP-55 manufactured by Nippon Jarrel-Ash Co., Ltd.) to determine the Si content.

[Analysis of O and C Contents]

The O content was determined by an inert gas fusion-infrared absorption method with an oxygen analyzer (EMGA-650 manufactured by HORIBA Ltd.). The C content was determined by a combustion-infrared absorption method with a carbon analyzer (CS-444 manufactured by LECO).

(Measurement Results)

Figure 2:
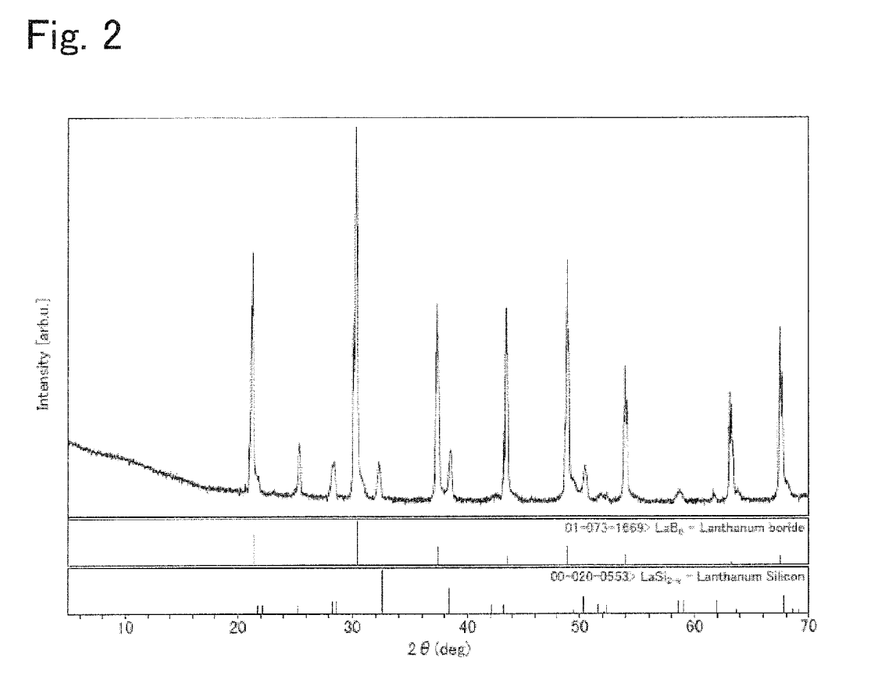
FIG. 2 illustrates results of X-ray diffractometry obtained in Example 1.
Figure 4:
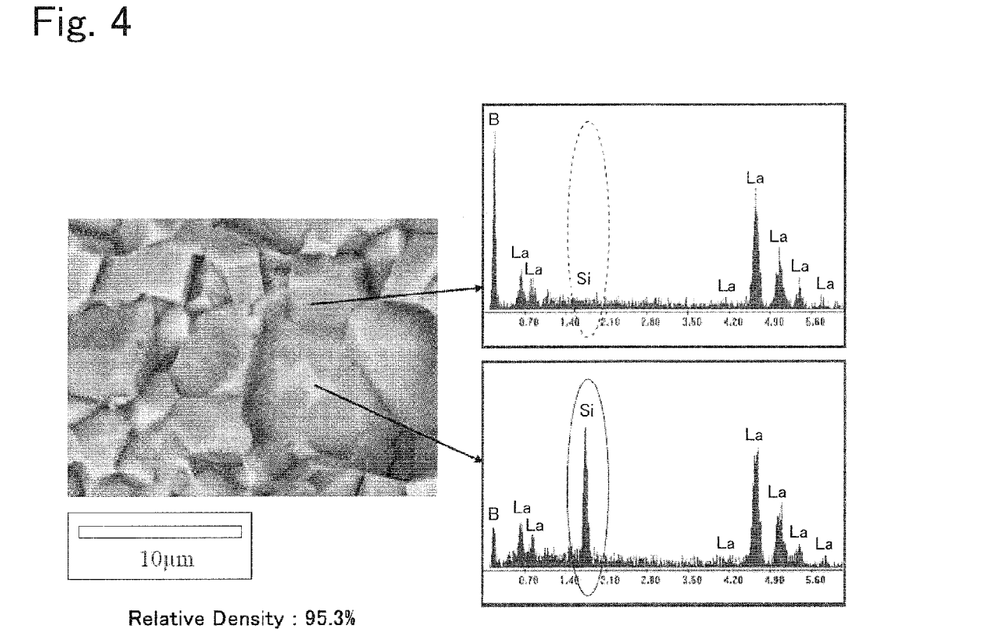
FIG. 4 illustrates a SEM micrograph and results of EDS elemental analysis obtained in Example 1.

The measurement results are described in Table 1. As illustrated in Example 1, press-free sintering in a SiC sintering container at 1725° C. (the maximum sintering temperature) resulted in highly dense sintered bodies having a relative density of 95.3% without the addition of any sintering additives. FIG. 2 illustrates the results of X-ray diffractometry of the sintered body obtained in Example 1. As illustrated in FIG. 2, the spectrum showed a peak other than that assigned to the main phase $LaB_6$. This peak was in agreement with JCPDS Card No. 020-0553 $LaSi_{2-x}$. FIG. 4 illustrates a SEM micrograph (a backscattered electron image) and the results of EDS elemental analysis obtained with respect to the sintered body of Example 1. As illustrated in FIG. 4, it has been found that the sintered body included lanthanum boride particles as well as a second phase shown with a different contrast which appeared to wet grain boundaries of lanthanum boride. The EDS elemental analysis showed that the second phase was based on La and Si. That is, these results in combination with the XRD results in FIG. 2 identified that the second phase to be $LaSi_{2-x}$. The Si content in the sintered body was 0.58 mass %. Because the Si content in the material powder was not more than the detection limit (0.01 mass %), an increase in Si content was confirmed.

Figure 3:
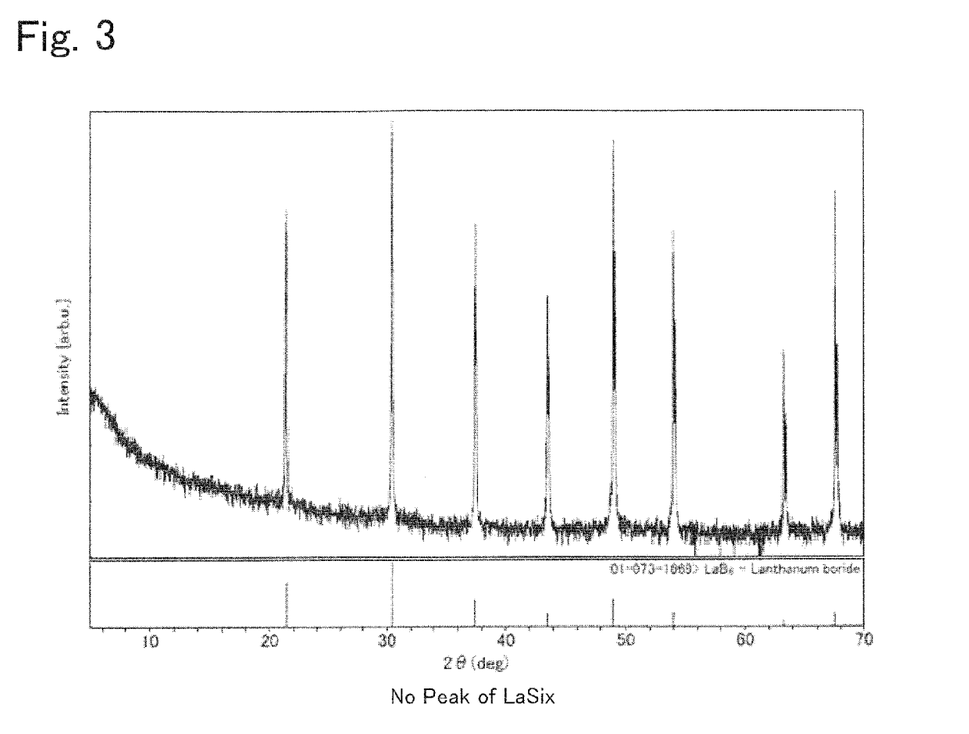
FIG. 3 illustrates results of X-ray diffractometry obtained in Comparative Example 10.
Figure 5:
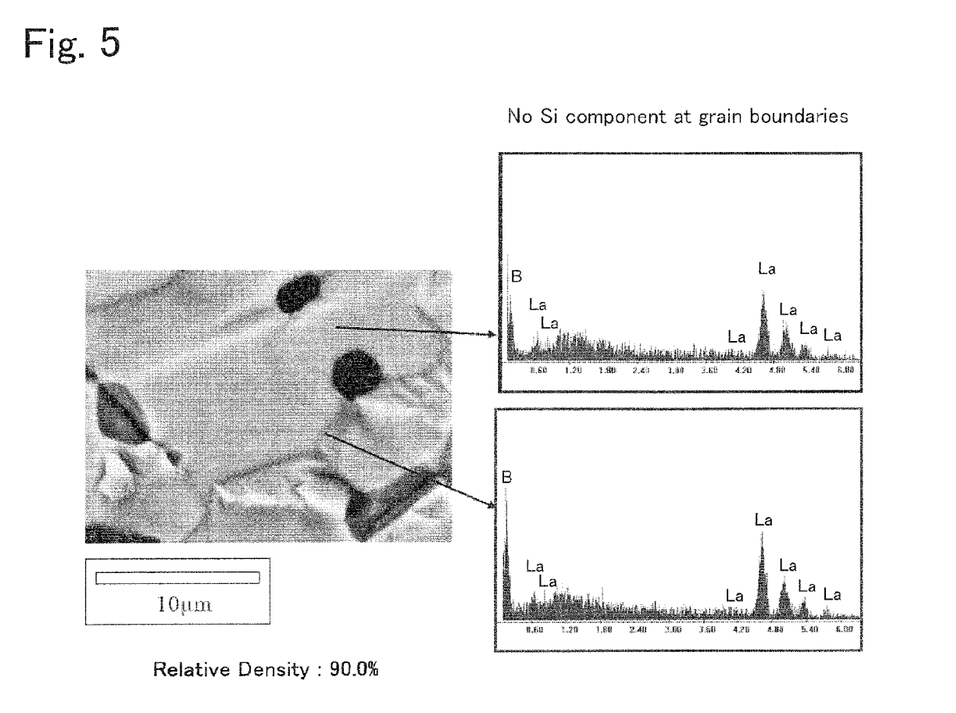
FIG. 5 illustrates a SEM micrograph and results of EDS elemental analysis obtained in Comparative Example 10.

Examples 2 to 17 resulted in highly dense sintered bodies having a relative density of not less than 92%. Similarly to Example 1, the X-ray diffractometry and the SEM observation/EDS analysis confirmed the presence of $LaSi_x$ phase (0<x≤2) at grain boundaries of $LaB_6$. The Si contents in the respective sintered bodies, as described in Table 1, were all not less than 0.03 mass %. The results in Examples 15 to 17 showed that sintering was promoted also by causing the lanthanum boride green compacts to contain a silicon-containing material instead of sintering the green compacts in the presence of a silicon-containing material around the green compacts. In this case, it is probable that Si components formed by the reaction during sintering are partly evaporated and partly form a liquid phase which enhances the sintering properties of lanthanum boride. It has been also found that the green compacts containing a silicon-containing material can be sintered at a lower sintering temperature, for example 1650° C., compared to when sintering is performed in the presence of SiC around the green compacts. In contrast, as illustrated in Comparative Example 1, press-free sintering in a SiC sintering container did not allow densification to take place sufficiently and resulted in a relative density of 82.8% when performed at a sintering temperature of 1650° C. Based on the results of XRD and EDS analyses of this material (see FIGS. 3 and 5), the absence of $LaSi_{2-x}$ in contrast to Example 1 was probably the reason for the insufficient densification.

As illustrated in Comparative Examples 2 and 3, sintering in a C or $B_4C$ sintering container did not allow densification to take place sufficiently, resulting in relative densities of 76.6% and 81.2%, respectively. The X-ray diffractometry did not detect the presence of $LaSi_x$ phase, but showed a peak corresponding to lanthanum carbide. The low relative densities were probably ascribed to the absence of $LaSi_x$ phase and the occurrence of carbide.

As illustrated in Comparative Examples 4 to 7, sintering in a BN sintering container did not allow densification to take place and resulted in a very low relative density ranging from 60.1 to 69.4%. The X-ray diffractometry and the SEM/EDS analysis did not detect the presence of $LaSi_x$ phase in any of the sintered bodies.

As illustrated in Comparative Examples 8 and 9, HP sintering did not allow densification to take place sufficiently and resulted in relative densities of 84.5% and 88.2%, respectively. The X-ray diffractometry did not detect the presence of $LaSi_x$ phase, but showed a peak corresponding to lanthanum carbide. Even hot pressing did not realize sufficient densification because of the absence of $LaSi_x$ phase.

Comparative Example 10, in which sintered bodies were fabricated from a mixture of the material powder $LaB_6$ with 1.0 mass % of metallic Si with reference to Patent Literature 4, resulted in a relative density of 90.0%. Although this value was close to that described in the literature, the sintered bodies from Examples according to the invention outperformed this sintered body. The X-ray diffractometry and the SEM observation/EDS analysis with respect to this literature material did not detect the presence of $LaSi_x$ phase in contrast to Examples. That is, it has been found that a $LaSi_x$ phase which promotes densification cannot be formed by adding a metallic Si powder, and densification to a relative density of not less than 92% is difficult to obtain by such methods.

Separately, the material obtained in Example 1 was tested by a four-probe method to determine the conductivity, resulting in 6×10⁶ [1/Ω·m]. Thus, it has been confirmed that the material has a high conductivity comparable to known $LaB_6$ materials and can be used as highly conductive materials such as electrode materials.

TABLE 1

| Sample[1] | Sintering Temperature (° C.) | Sintering Method | Kind of Material Powder $LaB_6$ | Material of Sintering Container | Si Content of Sintered Compact (mass %) | LaSix | Relative Density (%) | O Content of Sintered Compact[2] (mass %) | C Content of Sintered Compact[2] (mass %) |
|---|---|---|---|---|---|---|---|---|---|
| Example 1 | 1725 | Press-free | A | SiC | 0.58 | Presence | 95.3 | 0.11 | 0.05 |
| Example 2 | 1700 | Press-free | A | SiC | 0.57 | Presence | 95.0 | 0.11 | 0.04 |
| Example 3 | 1850 | Press-free | A | SiC | 0.27 | Presence | 94.4 | 0.16 | 0.12 |
| Example 4 | 1900 | Press-free | A | SiC | 0.05 | Presence | 94.3 | | |
| Example 5 | 1725 | Press-free | B | SiC | 0.46 | Presence | 94.2 | 0.10 | 0.04 |
| Example 6 | 1800 | Press-free | A | SiC | 0.30 | Presence | 94.5 | | |
| Example 7 | 1750 | Press-free | A | SiC | 0.51 | Presence | 94.7 | 0.11 | 0.07 |
| Example 8 | 1675 | Press-free | A | SiC | 0.48 | Presence | 94.6 | | |
| Example 9 | 1900 | Press-free | B | SiC | 0.03 | Presence | 93.0 | | |
| Example 10 | 1800 | Press-free | B | SiC | 0.28 | Presence | 93.5 | | |
| Example 11 | 1725 | Press-free | A | SiC | 0.55 | Presence | 98.3 | | |
| Example 12 | 1725 | Press-free | A | SiC | 0.40 | Presence | 95.0 | | |
| Example 13 | 1800 | Press-free | A | SiC | 0.18 | Presence | 94.0 | | |
| Example 14 | 1900 | Press-free | A | SiC | 0.04 | Presence | 93.8 | | |
| Example 15 | 1650 | Press-free | A | BN | 0.24 | Presence | 95.1 | 0.18 | 0.03 |
| Example 16 | 1675 | Press-free | A | BN | 0.66 | Presence | 96.0 | 0.14 | 0.19 |
| Example 17 | 1725 | Press-free | A | BN | 0.23 | Presence | 97.1 | 0.27 | 0.07 |
| Comparative Example 1 | 1650 | Press-free | A | SiC | 0.15 | Absence | 82.8 | 0.44 | 0.07 |
| Comparative Example 2 | 1900 | Press-free | A | C | — | Absence | 76.6 | | |
| Comparative Example 3 | 1900 | Press-free | A | $B_4C$ | — | Absence | 81.2 | | |
| Comparative Example 4 | 1900 | Press-free | A | BN | — | Absence | 69.4 | | |
| Comparative Example 5 | 1800 | Press-free | A | BN | — | Absence | 60.1 | | |
| Comparative Example 6 | 1800 | Press-free | B | BN | — | Absence | 61.1 | | |
| Comparative Example 7 | 1800 | Press-free | C | BN | — | Absence | 66.1 | | |
| Comparative Example 8 | 1900 | HP | A | C | — | Absence | 84.5 | | |
| Comparative Example 9 | 2000 | HP | A | C | — | Absence | 88.2 | | |
| Comparative Example 10 | 1800 | Press-free | A | BN | — | Absence | 90.0 | | |

[1]In Example 15, SiC powder of 1.0 mass % in terms of Si is mixed and sintered. In Example 16, SiC powder of 1.5 mass % in terms of Si is mixed and sintered. In Example 17, SiC powder of 1.0 mass % in terms of Si is mixed and sintered. In Comparative Example 10, Si metal powder of 1.0 mass % is mixed and sintered.
[2]Samples in blank are not measured.

The present application claims priority from Japanese Patent Application No. 2012-193497 filed on Sep. 3, 2012, and Japanese Patent Application No. 2013-110605 filed on May 27, 2013, the entire contents of which are incorporated herein by reference.

What is claimed is:

1. A lanthanum boride sintered body which comprises a first phase including lanthanum boride, and a second phase including lanthanum and silicon.

2. The lanthanum boride sintered body according to claim 1, wherein the second phase is present at grain boundaries of lanthanum boride.

3. The lanthanum boride sintered body according to claim 1, wherein the main component of the second phase is lanthanum silicide.

4. The lanthanum boride sintered body according to claim 1, which has a relative density of not less than 92%.

5. A lanthanum boride sintered body, which includes silicon and has a relative density of not less than 92%.

6. The lanthanum boride sintered body according to claim 1, which is sintered by press-free sintering.

7. The lanthanum boride sintered body according to claim 1, which has a relative density of not less than 94%.

8. The lanthanum boride sintered body according to claim 1, wherein a content of boron and lanthanum is not less than 98 mass %.

9. The lanthanum boride sintered body according to claim 1, wherein a content of silicon is 0.1 to 1.0 mass %.

10. A method for producing lanthanum boride sintered body, comprising:
a sintering step of sintering a lanthanum boride green compact by press-free sintering in an inert atmosphere or under vacuum in the presence of a silicon-containing material around and/or within the green compact, thereby obtaining a lanthanum boride sintered body comprising a first phase including lanthanum boride, and a second phase including lanthanum and silicon.

11. The method for producing lanthanum boride sintered body according to claim 10, wherein the sintering step is performed while the lanthanum boride green compact is placed and sintered in a sintering container mainly composed of the silicon-containing material.

12. The method for producing lanthanum boride sintered body according to claim 10, wherein the sintering step is performed while the green compact and the silicon-containing material are disposed in a sintering container.

13. The method for producing lanthanum boride sintered body according to claim 10, wherein the silicon-containing material is at least one of silicon carbide and silicon nitride.

14. The method for producing lanthanum boride sintered body according to claim 10, wherein the sintering step is performed in such a manner that the green compact is sintered at a maximum sintering temperature which is 1650° C. or more and less than 2000° C.

15. The method for producing lanthanum boride sintered body according to claim 14, wherein the sintering step is performed in such a manner that in an inert atmosphere and in the absence of pressing, the green compact is temporarily held at a prescribed intermediate temperature lower than the maximum sintering temperature and are thereafter brought to the maximum sintering temperature.

16. The method for producing lanthanum boride sintered body according to claim 14, wherein the sintering step is performed in such a manner that the temperature is raised at a reduced pressure when the temperature is within a prescribed range of initial temperatures lower than the maximum sintering temperature, and after the temperature exceeds the range of initial temperatures, the temperature is raised to the maximum sintering temperature in an inert atmosphere and in the absence of pressing.

* * * * *